United States Patent
Massal

(10) Patent No.: US 10,486,804 B2
(45) Date of Patent: Nov. 26, 2019

(54) FLAPPING ABUTMENT MECHANISM FOR A LIFT ASSEMBLY, A ROTORCRAFT ROTOR INCLUDING THE ABUTMENT MECHANISM, AND A ROTORCRAFT

(71) Applicant: AIRBUS HELICOPTERS, Marignane (FR)

(72) Inventor: Fabien Massal, Saint Savournin (FR)

(73) Assignee: AIRBUS HELICOPTERS, Marignane (FR)

( * ) Notice: Subject to any disclaimer, the term of this patent is extended or adjusted under 35 U.S.C. 154(b) by 777 days.

(21) Appl. No.: 15/079,691

(22) Filed: Mar. 24, 2016

(65) Prior Publication Data
US 2016/0280366 A1  Sep. 29, 2016

(30) Foreign Application Priority Data
Mar. 27, 2015 (FR) ...................................... 15 00621

(51) Int. Cl.
*B64C 27/32* (2006.01)
*B64C 27/625* (2006.01)

(52) U.S. Cl.
CPC .......... *B64C 27/322* (2013.01); *B64C 27/625* (2013.01)

(58) Field of Classification Search
CPC ....... B64C 27/322; B64C 27/39; B64C 27/41; B64C 27/51; B64C 27/625; F16F 9/56
See application file for complete search history.

(56) References Cited

U.S. PATENT DOCUMENTS

| | | | |
|---|---|---|---|
| 2,475,333 A | 7/1949 | Morris | |
| 2,554,774 A | 5/1951 | Buivid | |
| 2,595,642 A * | 5/1952 | Daland | ................... B64C 27/51 267/70 |
| 2,717,653 A | 9/1955 | Emmerson | |
| 2,719,593 A | 10/1955 | Alex | |
| 4,342,540 A | 8/1982 | Lovera et al. | |
| 4,652,210 A | 3/1987 | Leman et al. | |
| 4,737,075 A | 4/1988 | Leman et al. | |
| 5,951,252 A | 9/1999 | Muylaert | |

(Continued)

FOREIGN PATENT DOCUMENTS

| | | |
|---|---|---|
| EP | 0135296 | 3/1985 |
| EP | 1371554 | 12/2003 |

(Continued)

OTHER PUBLICATIONS

French Search Report for French Application No. 1500621, Completed by the French Patent Office dated Jan. 14, 2016, 7 Pages.

*Primary Examiner* — Jason D Shanske
*Assistant Examiner* — Julian B Getachew
(74) *Attorney, Agent, or Firm* — Brooks Kushman P.C.

(57) ABSTRACT

An abutment mechanism for a lift assembly of an aircraft. The abutment mechanism comprises a single rigid link having variable travel, the link comprising a rod and a body, the rod being movable in translation relative to the body along the longitudinal direction through said travel, the abutment mechanism including a movement member for adjusting an amplitude of the travel as a function of at least one predetermined parameter, the link having two endpieces suitable for being hinged respectively to a said lift assembly and to a said drive system.

20 Claims, 5 Drawing Sheets

(56) References Cited

U.S. PATENT DOCUMENTS

2012/0256055 A1    10/2012    Jolly et al.
2014/0262645 A1     9/2014    Modrzejewski et al.

FOREIGN PATENT DOCUMENTS

| | | |
|---|---|---|
| FR | 2447856 | 8/1980 |
| FR | 2551723 | 3/1985 |
| FR | 2584997 | 1/1987 |
| FR | 2735094 | 12/1996 |
| GB | 2024133 | 1/1980 |
| GB | 2073121 | 10/1981 |

* cited by examiner

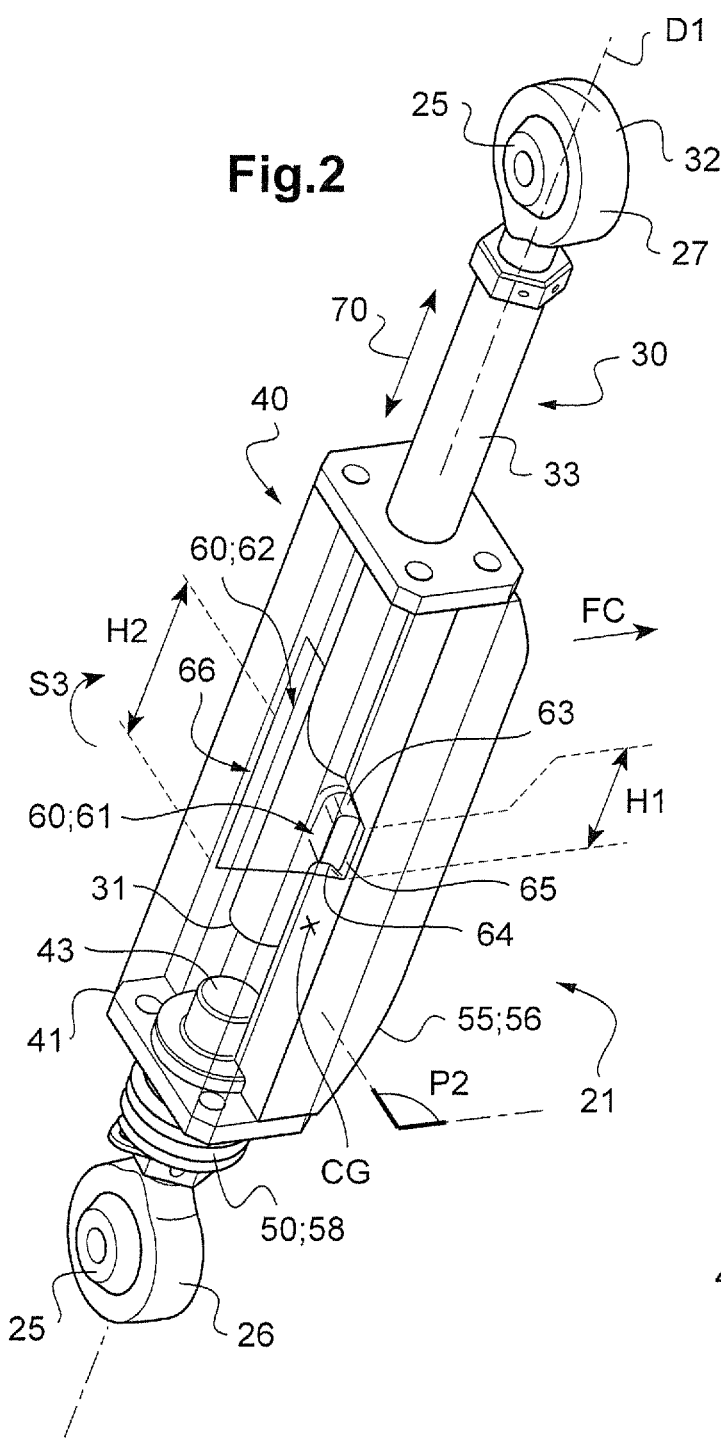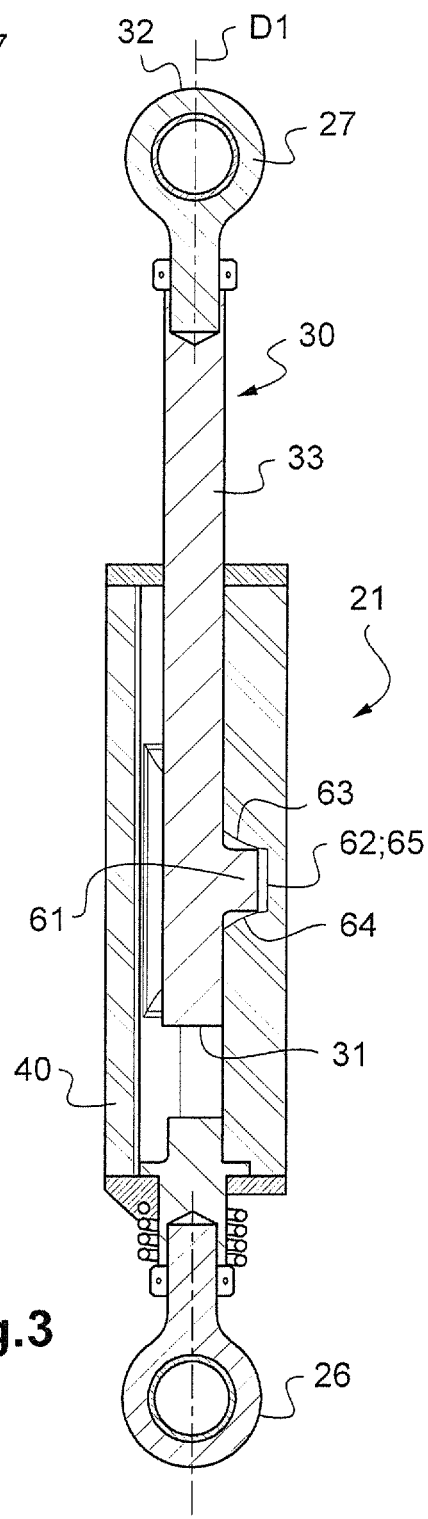

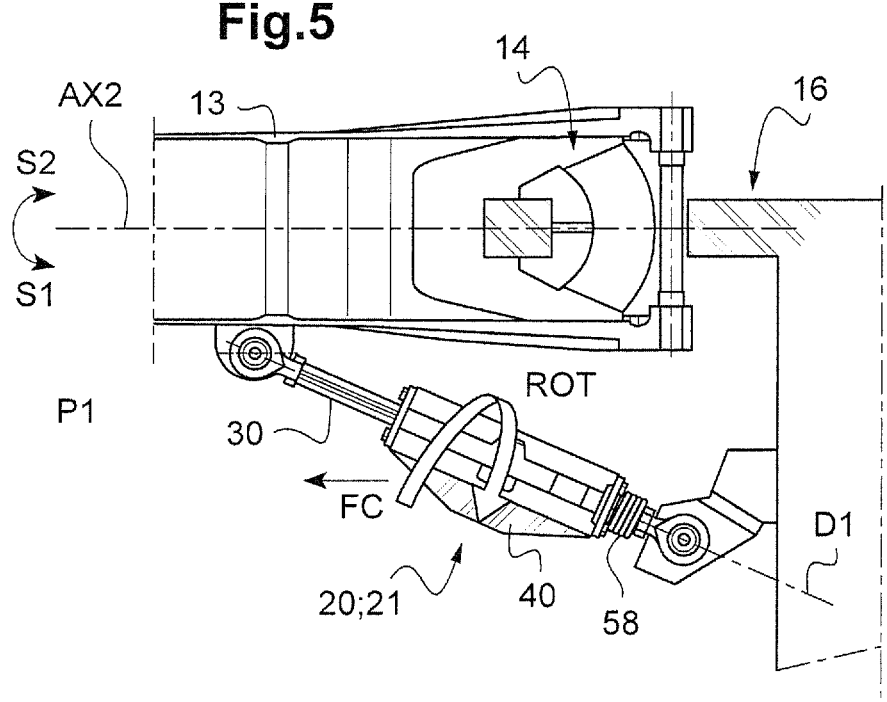
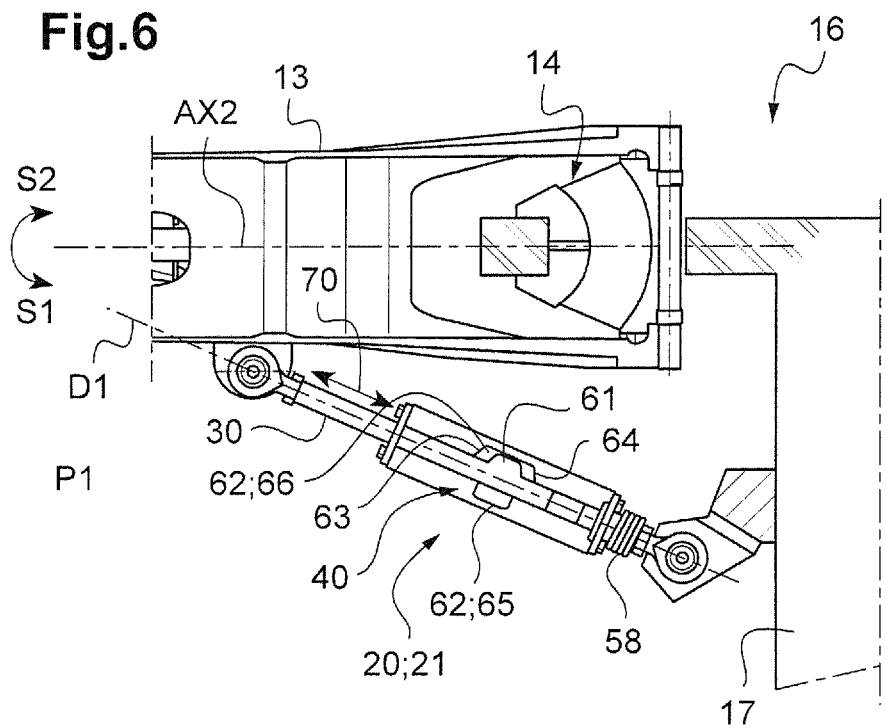

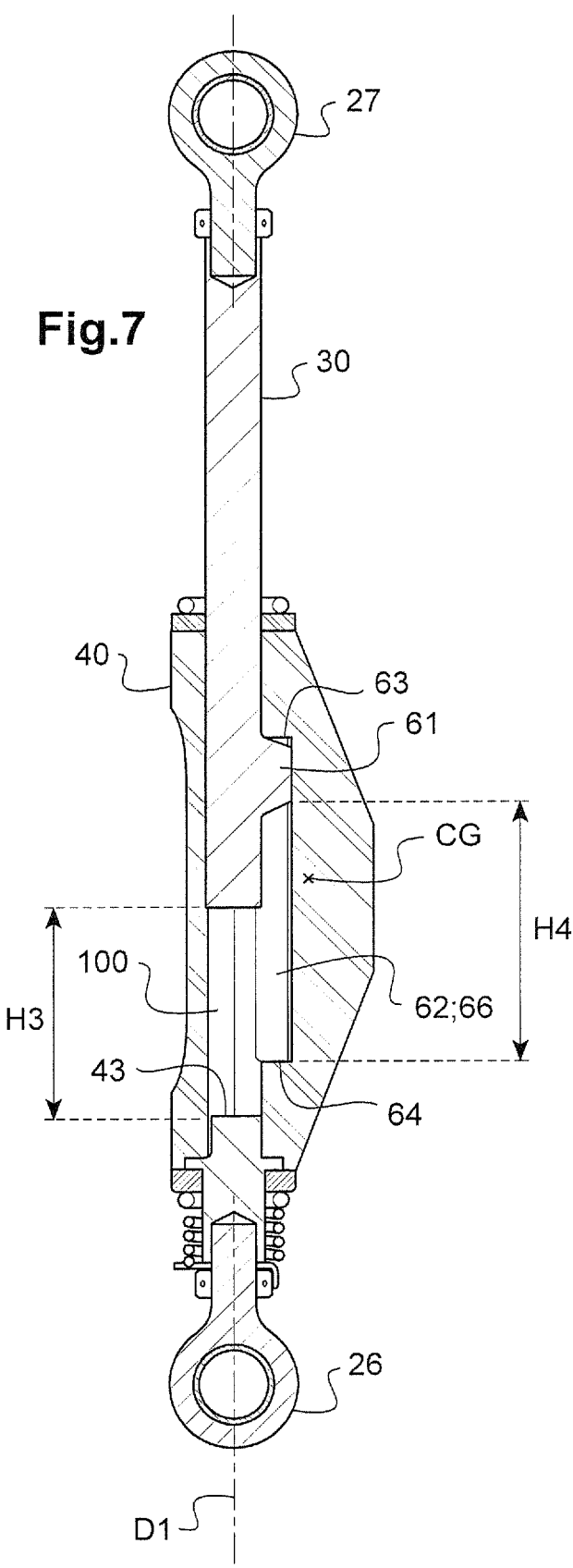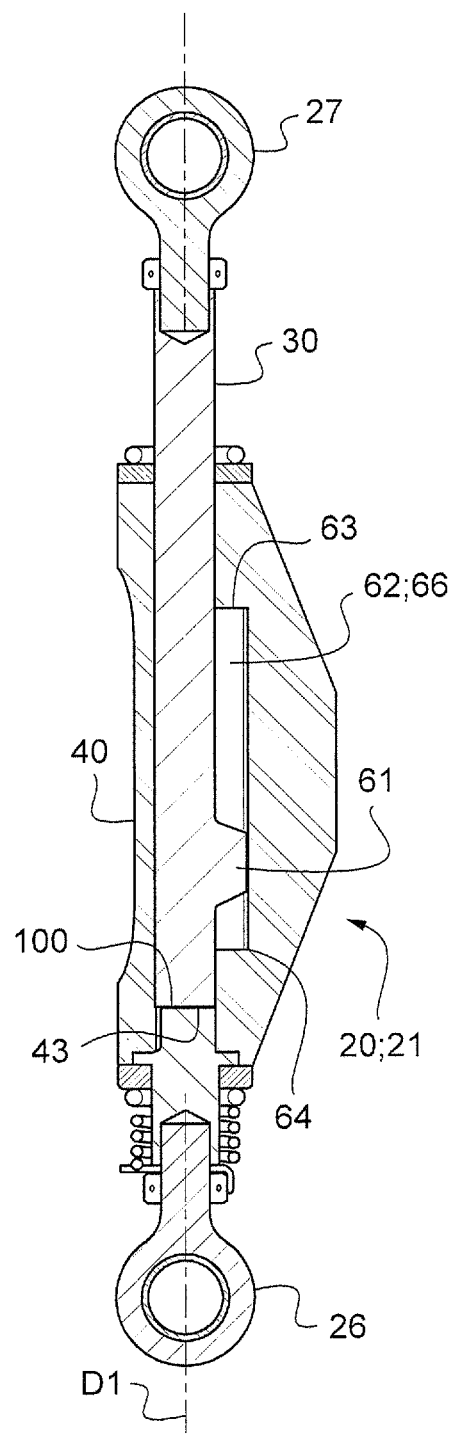

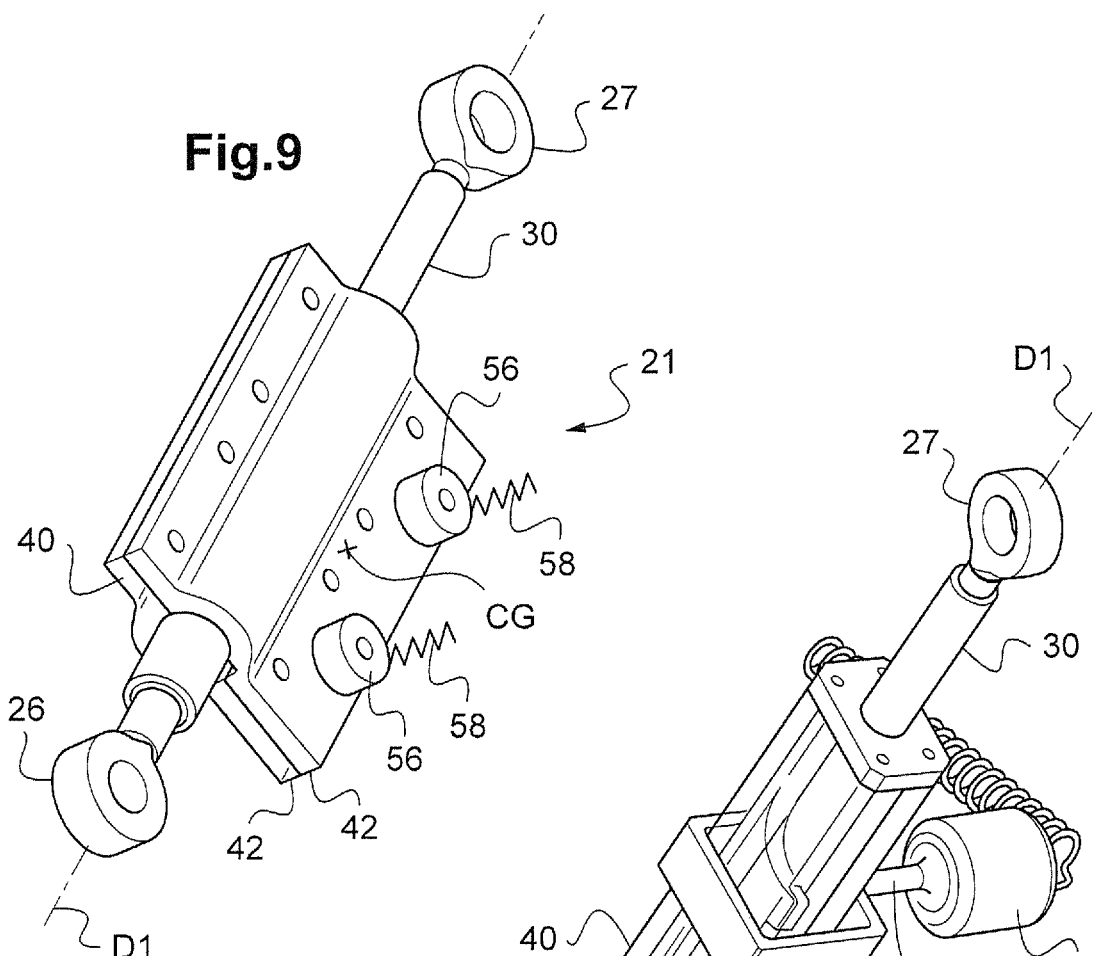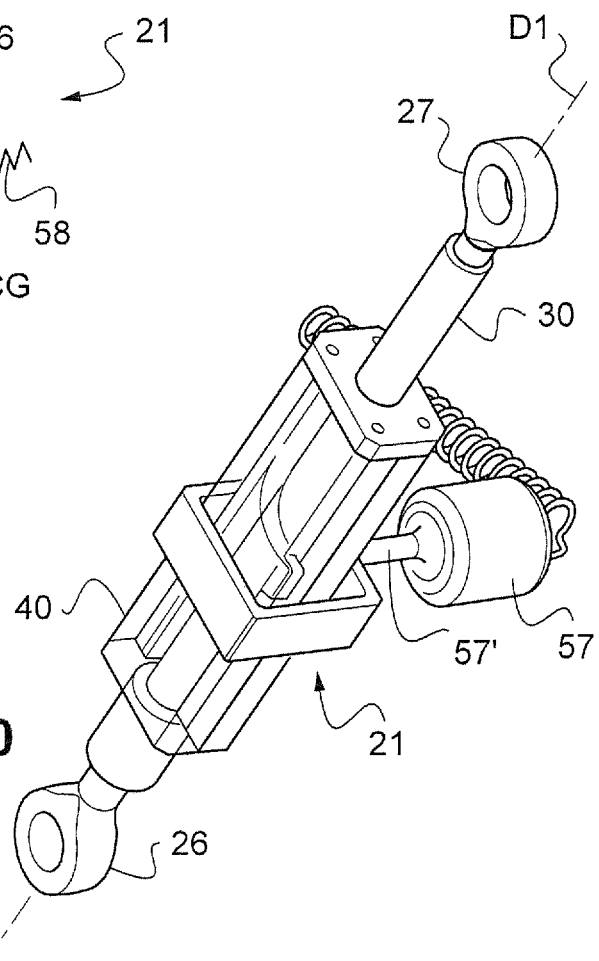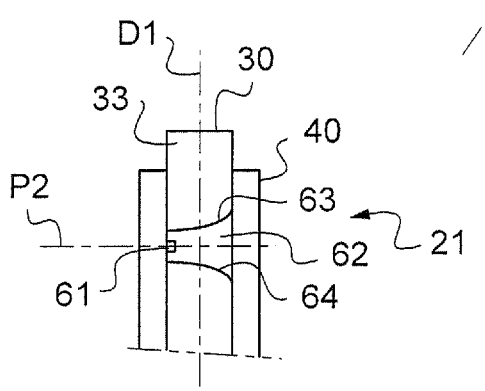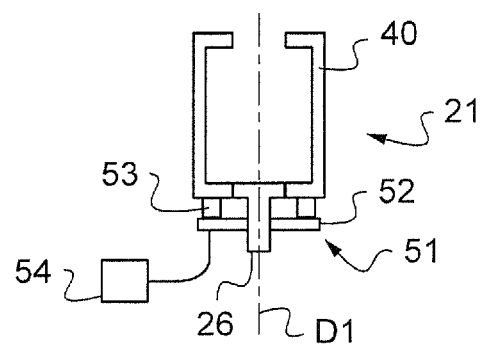

FLAPPING ABUTMENT MECHANISM FOR A LIFT ASSEMBLY, A ROTORCRAFT ROTOR INCLUDING THE ABUTMENT MECHANISM, AND A ROTORCRAFT

CROSS REFERENCE TO RELATED APPLICATION

This application claims priority to French patent application No. FR 15 00621 filed on Mar. 27, 2015, the disclosure of which is incorporated in its entirety by reference herein.

BACKGROUND OF THE INVENTION (1) Field of the Invention

The present invention relates to a flapping abutment mechanism for a lift assembly, to a rotorcraft rotor, and to a rotorcraft having such a rotor.

The invention thus lies in the technical field of rotorcraft rotors. More specifically, the invention lies in the field of abutments fitted to such rotors in order to limit flapping movement of the lift elements carried by the rotor.

(2) Description of Related Art

A rotorcraft usually has at least one rotor for providing the rotorcraft with at least some of its lift and possibly also with propulsion.

A rotor comprises at least two lift assemblies that are rotated by a drive system. Each lift assembly is fastened in particular to the drive system by at least one retention and mobility member.

For example, such a drive system may comprise a hub constrained to rotate with a rotary mast. Each lift assembly is then provided with a blade that is connected to the hub by means of a retaining and mobility member. A retaining and mobility member optionally includes a hinge referred to as a "spherical abutment". Each spherical abutment may have one strength member fastened to the hub and another strength member fastened to a cuff, regardless of whether the cuff is or is not integral with a lift element of the blade.

Each blade may thus comprise a lift element fastened to a cuff or indeed a lift element having an integral cuff. The blades are thus substantially plane elongate elements that are carried at one end by a drive system.

The retaining and mobility members equipped each respective lift assembly at its root in such a manner as to allow the lift assemblies to be maneuvered by an operator. By way of example, mounting the lift assemblies movably on a drive system enables a pilot of the rotorcraft to act in flight to cause the pitch of the lift assemblies to vary collectively or cyclically in order to influence the behavior of the rotorcraft with respect to its lift and/or its propulsion.

By way of example, the ability of the lift assemblies to move relative to a drive system makes it possible for them to perform lead/lag movement, pitch movement, and up and down flapping movement. The concept of "up and down" should be considered relative to the direction in which the axis of rotation of the rotor extends. When the rotor is rotating at a nominal speed, the lift assemblies are spontaneously driven upwards under the effect of centrifugal force and of the lift from those lift assemblies. When the rotor is stationary, the lift assemblies are no longer subjected to any force other than gravity and they are therefore naturally moved downwards.

A rotor is thus commonly fitted with an "abutment mechanism" that limits the travel of lift assemblies, particularly in flapping.

In an embodiment, the abutment mechanism for each blade may comprise a bottom abutment member and a top abutment member forming obstacles to the individual flapping travel of its blade, respectively downwards and upwards. An abutment mechanism includes a bottom abutment track and a top abutment track, which tracks are arranged on a retention and mobility member. By way of example, a strength member of a spherical abutment may carry an abutment pad presenting an abutment track.

In the event of undesired flapping movement of the blade, the abutment track comes into contact against an abutment member, thereby limiting the flapping movement of the blade.

A particular function of the abutment mechanism is to limit the abutment movement of the blades when the rotor is stationary and while the rotor is being set into rotation, and more particularly in the presence of wind. The abutment mechanism can also limit the flapping of the blades during an operation of folding the blades. In particular in the presence of spherical abutments hinging a blade to the hub, the abutment mechanism tends to preserve the spherical abutment when the rotorcraft is on the ground by preventing flapping movement of a blade in the absence of centrifugal force which might lead to the component elements of the spherical abutment becoming delaminated.

While the rotor is in rotation, the top abutment members might possibly not constitute any obstacle to the freedom of the lift assemblies to move, in particular upwards. The abutment mechanism can then provide retraction means for retracting the top abutment members while the rotor is in operation.

The top abutment members are then mounted on the hub to be movable between two positions, namely between a position that is to be occupied below a threshold speed of rotation of the rotor, and a position that is to be occupied above that threshold speed of rotation.

In summary, an abutment mechanism usually includes one top abutment member per lift assembly, a top abutment track carried by a lift assembly, and retraction means capable of positioning an abutment member in register with the abutment track, when necessary.

In addition, the abutment mechanism has a low abutment ring that is common to all of the blades. The low abutment ring is movable in a groove.

In flight, only one blade at a time may potentially move downwards so as to push against the ring. The ring therefore does not impede the flapping of the lift elements.

In contrast, when on the ground, at low speeds of rotation and when stationary, the lift assemblies come simultaneously into contact with the ring, such that the ring prevents all of them from moving in flapping. Under such circumstances and given its function, such a ring is sometimes referred to as a "droop restrainer ring" or "anneau réciproque" in French language.

A known abutment mechanism for a blade thus comprises a low abutment ring common to all of the lift elements, and one retractable high abutment ring for each lift element.

Those two abutment systems are independent and tend to increase the number of mechanical parts needed in a space that is, by its very nature, limited.

Furthermore, on a heavy aircraft the low abutment ring may present weight that is not negligible, and it can generate a degree of unbalance that needs to be taken into consideration.

Furthermore, replacing the abutment mechanism for maintenance purposes can be tedious, sometimes requiring the associated lift assembly to be removed.

Furthermore, the positioning of an abutment mechanism on a rotor can sometimes be difficult. Specifically, a rotor may have numerous other members, leaving little room to install an abutment system.

Documents FR 2 584 997, U.S. Pat. No. 2,719,593, FR 2 551 723, FR 2 447 856, FR 2 735 094, GB 2 073 121, and EP 1 371 554 describe various abutment systems.

Document U.S. Pat. No. 2,717,653 describes a rotor having an oscillating hub hinged to a mast. The hub carries a plurality of lift assemblies.

In addition, the rotor is fitted with an abutment mechanism comprising an annular plate that slides along the mast to constitute a bottom abutment of the hub. Under such circumstances, the plate is controlled by a retraction system comprising flyweights that are movable under the effect of centrifugal force. When the centrifugal force exerted on the flyweight is low, the plate restricts the angular movements of the hub to angular movements that are of small amplitude. Conversely, when the centrifugal force exerted on the flyweights is high, the plate slides and allow the hub to perform angular movements of large amplitude.

Document U.S. Pat. No. 2,717,653 is thus remote from the field of the invention, i.e. the field of handling the flapping motion of lift assemblies.

Document U.S. Pat. No. 2,475,333 describes a rotor having lift assemblies that are connected to a hub by retention and mobility members.

A scissors linkage having two links that are hinged to each other is arranged between firstly a retention and mobility member and secondly the mast. When the scissors linkage is deployed, both links of the linkage are in alignment and block downward flapping of the lift assembly. When the lift assembly flaps upwards, the scissors linkage folds to allow such flapping movement of the lift assembly.

Document U.S. Pat. No. 5,951,252 describes a deployable high abutment having a threaded rod that moves apart the two branches of a scissors linkage. Each branch carries a pad that acts as an abutment surface.

Documents US 2014/262645, EP 0 135 296, and US 2012/256055 describe lead/lag dampers and have no connection with the invention.

Documents U.S. Pat. No. 2,554,774 and GB 2 024 133 are also known.

BRIEF SUMMARY OF THE INVENTION

One object of the present invention is to propose a rotor having a mechanism that is simple and easy to achieve for limiting the flapping travel of lift assemblies of a main rotor of a rotorcraft.

The invention thus provides an abutment mechanism for limiting flapping in two opposite directions of a lift assembly of a rotorcraft relative to a drive system, the drive system being suitable for driving said lift assembly in rotation about an axis in elevation.

The abutment mechanism comprises a single rigid link having variable travel in a longitudinal direction in which the link extends, the link comprising a rod and a body, the rod being movable in translation relative to the body along the longitudinal direction through said travel, the abutment mechanism including a movement member for adjusting an amplitude of the travel as a function of at least one predetermined parameter, the link having two endpieces suitable for being hinged respectively to a lift assembly and to a drive system, one of said two endpieces being referred to as a "first" endpiece and being attached to the body, and another one of said two endpieces being referred to as a "second" endpiece and being secured to said rod, said rod not being a damper.

The term "travel" means that the link presents a length in the longitudinal direction between an end of the first endpiece and an end of the second endpiece that can vary in operation. The travel thus represents the ability of the link to lengthen or shorten over a certain amplitude. The upward and downward travel of a lift assembly is thus limited by the authorized travel of the link.

The term "through said travel" means that the travel of the rod relative to the body, and consequently the flapping of a lift assembly, is authorized by the link within the travel limit of that link.

The term "the rod being movable in translation relative to the body" means that the rod and the body can move relative to each other. Thus, the rod may be moved while the body is held in a substantially stationary position relative to the drive system, or the body may be moved while the rod is held in a substantially stationary position relative to the drive system.

The term "substantially stationary" means that the associated member has only those degrees of freedom that are made available to the corresponding endpiece relative to the drive system.

Under such circumstances, the link is hinged firstly to the drive system and secondly to a lift assembly by the first endpiece and by the second endpiece. The link may lengthen or shorten with travel of variable amplitude, which amplitude is controlled by the movement device. Thus, the flapping of a lift assembly is restricted to the travel amplitude.

Specifically, when the lift assembly begins to perform flapping movement, the lift assembly exerts a traction or compression force on the link. Since the link is also prevented from moving relative to the drive system, the link tends to lengthen or shorten under the effect of the force exerted on the link by the lift assembly. This lengthening or shortening is allowed by the link within the limit of the travel that is possible for the link at any instant.

Thus, when the aircraft is on the ground, the amplitude can be minimized. Under such circumstances, the flapping of the lift assembly on the ground is limited to a small amplitude between a low first extreme position and a high first extreme position. Such a small amplitude may be of the order of two degrees, for example.

In contrast, the movement member may be activated in flight in order to maximize this amplitude. Under such circumstances, the flapping of the lift assembly is limited to a large amplitude between a low second extreme position and a high second extreme position. Such a large amplitude may be of the order of thirty degrees, for example. By way of example, the lift assembly may oscillate on either side of a middle position, between a low amplitude of about −10 degrees and a high amplitude of about 25 degrees.

The link of the abutment mechanism is not a conventional variable length link. Such a variable length link has a screw to enable an operator to modify its length while on the ground. Without the intervention of an operator, the length of a variable length link remains constant.

Conversely, while the link in the abutment mechanism is in operation, its length can vary in independent manner over a variable amplitude.

This link of the abutment mechanism thus represents a single mechanical member serving to limit upward and downward flapping of a lift assembly relative to a drive system for a rotor.

Each link of the abutment mechanism can easily be installed on an existing rotor, e.g. under the hub. Under such circumstances, the mechanism of the invention can release space on a rotor head in comparison with a conventional device interposed between a lift assembly and a hub, for example. Such space may be used for other purposes, and for example for installing an anti-icing system.

Furthermore, the abutment mechanism can make maintenance operations easier. Specifically, the mechanism requires the link to be fastened only to the lift assembly and to the drive system. Under such circumstances, removing a link of the abutment mechanism does not necessarily require the corresponding lift assembly to be removed as well.

Furthermore, the abutment mechanism can be fitted to different rotors, and in particular this can be done independently of the number of lift assemblies.

Furthermore, the abutment mechanism has a small number of parts, since the movement member of a link may form an integral portion of the link. Furthermore, a single abutment serves to block flapping of a lift assembly, not only downwards but also upwards. The abutment mechanism can thus be lighter than a mechanism that requires specific abutments such as a high abutment and a droop restrainer ring.

The abutment mechanism may also include one or more of the following characteristics.

Thus, at least one of said two endpieces may include a ball-joint hinge.

For example, a link is connected to a lift assembly and to a drive system via two respective ball-joint hinges in order to minimize its impact on the freedom of a lift assembly to perform lead/lag movements and pitch-variation movements.

Furthermore, the body of the link may be hinged to the first endpiece to be movable in rotation relative to the first endpiece and to the rod about the longitudinal direction, the movement member moving the body in rotation relative to the first endpiece and to the rod in order to vary the travel authorized for said rod relative to the body.

Relative rotation between the body and the rod thus modifies the travel amplitude authorized for the link.

In addition, the rod of a link of an abutment mechanism may extend from a first end arranged in the body to a second end provided with the second endpiece, the rod being movable in rotation and in translation relative to the body, the rod and the body each having a respective abutment member, one of the abutment members comprising a radial protuberance and the other abutment member comprising a setback in a wall, the radial protuberance being movable in the setback, the setback being defined longitudinally by a high abutment surface and by a low abutment surface between which said protuberance is permanently arranged, the high abutment surface and the low abutment surface being separated by a longitudinal height that varies circumferentially between a minimum height obtained in a first sector of the setback and a maximum height obtained in a second sector of the setback, the amplitude of the travel being at a minimum when the protuberance is positioned in the first sector by the movement member and being at a maximum when said protuberance is positioned in the second sector by the movement member.

For example, the rod may carry the protuberance, the body then having a wall including a setback. Conversely, the body may carry the protuberance, with the rod then having an internal setback.

Thus, the rod and the body are movable relative to each other in translation in the longitudinal direction and also in rotation.

The term "radial protuberance" means that the rod or the body, as the case may be, has a segment extending longitudinally, with the protuberance projecting from that segment in a direction that is radial, i.e. perpendicular to the longitudinal direction. Since the protuberance projects radially from the rod or the body, it can be received in a setback in the body or the rod, as the case may be.

This setback is defined in a direction parallel to the longitudinal direction by a high abutment surface and by a low abutment surface.

In addition, the term "varying circumferentially" means that the setback presents a height that varies around a circumference of the body or of the rod.

A sector of the setback represents a section in elevation on a plane containing the longitudinal direction. In the first sector, the height of the setback is at a minimum, thereby minimizing the travel authorized for the rod relative to the body. Conversely, in the second sector, the height of the setback is at a maximum, thereby maximizing the travel authorized for the rod relative to the body.

Thus, the movement member can position the protuberance in the first sector of the setback while on the ground and in the second sector of the setback while in flight, merely by establishing relative rotation between the rod and the body of a link.

Furthermore, the high abutment surface and the low abutment surface depart from each other in a circumferential direction starting from the first sector and going towards the second sector.

This characteristic makes it possible to obtain a setback receiving the protuberance that presents a height that varies around said circumferential direction.

In particular, the high abutment surface and the low abutment surface may be arranged symmetrically about a plane of symmetry that is perpendicular to the longitudinal direction.

The circumferential variation of each abutment surface may be determined by the manufacturer as a function of the transitions desired by the manufacturer between a stage of operation during which the protuberance is to be found in the first sector and a stage of operation in which the protuberance is to be found in the second sector.

Furthermore, the high abutment surface may act at all times to limit the amplitude of lengthening of said link. A lengthening of the link as a result of an upward flapping movement of a lift assembly is then stopped when the protuberance comes into contact against the high abutment surface.

In contrast, the low abutment surface may optionally constitute the low abutment under certain circumstances only.

For example, the link has an amplitude of shortening that is limited by the low abutment surface while the protuberance is arranged in the first sector.

In an alternative, the low abutment surface also limits the amplitude of shortening of the link while the protuberance is arranged in the second sector.

Nevertheless, and in another alternative, an internal space between the rod and an end wall of the body occupies a primary height that is less than a secondary height between the protuberance and the low abutment surface while the protuberance is arranged in the second sector, with shortening of said link then being interrupted when said rod comes into contact with said end wall.

This characteristic seeks to preserve the low abutment surface and/or the protuberance in the event of a relatively violent downward flapping movement of a lift assembly occurring in flight.

In a motor-driven embodiment, the movement member includes a motor and a measurement system measuring a speed of rotation of a rotor, said predetermined parameter being said speed of rotation.

The movement member then positions the protuberance of a link in the appropriate sector of the setback of a link as a function of the speed of rotation of the rotor.

By way of example, below a threshold speed of rotation, the motor positions the protuberance in the first sector. In contrast, above this threshold speed of rotation, the motor positions the protuberance in the second sector.

In a mechanical embodiment, the movement member includes a heavy element for offsetting the center of gravity of said body from said longitudinal direction so that the centrifugal force exerted on the body during rotation of said drive system generates movement in rotation of the body relative to the rod, said predetermined parameter being said centrifugal force, said movement member including a resilient return member tending to move said body relative to the rod in order to place said protuberance in said first sector.

The heavy element thus makes it possible to offset the center of gravity of the body relative to the longitudinal direction.

During rotation of the rotor, the centrifugal force exerted on the body then causes the body to move in rotation relative to the rod. This rotary movement thus enables the protuberance of a link to be moved within the setback of the link so as to modify the travel amplitude authorized for the link and thus for the lift assembly. For example, this amplitude increases when the protuberance moves from the first sector to the second sector.

The centrifugal force induces a force on the body acting against the return force generated by the resilient return member. Consequently, when the speed of rotation of the rotor decreases, the centrifugal force exerted on the body of the link decreases. The resilient return member then returns the body to its initial position so as to limit the travel amplitude that is authorized for the link and thus for the lift assembly.

Such a heavy element may include at least one flyweight that is fastened to the body and radially offset relative to the body.

Furthermore, the resilient return member may be fastened to the body and/or to the first endpiece and/or to the heavy element.

In addition to an abutment mechanism, the invention provides a rotor having a plurality of lift assemblies and a drive system for driving said lift assemblies in rotation.

Under such circumstances, the rotor includes, for at least one lift assembly, a single abutment mechanism of the invention of the type described above in order to limit upward and downward flapping of the lift assembly, the link of the abutment mechanism being hinged to the lift assembly and to the drive system.

In addition, since the lift assembly is movable in rotation about a pitch axis in order to modify the aerodynamic angle of incidence of the lift assembly relative to the incident air, the longitudinal direction of a link of the abutment mechanism of the lift assembly may be situated in a "pitch" plane containing the pitch axis, the pitch axis lying above the longitudinal direction. The term "above" means that, on the ground, the pitch axis is over than the longitudinal direction.

By aligning the link with the pitch axis of the lift assembly, specifically when the link is under a lift assembly, the abutment mechanism has limited impact on the pitch of the lift assembly.

In addition to a rotor, the invention also provides an aircraft provided with such a rotor.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 2 is a view of a link having a mechanical movement device;

FIGS. 3 and 4 are section views showing a protuberance arranged in a first sector of a setback in order to minimize flapping of a lift assembly;

FIG. 5 is a view showing a protuberance passing from a first sector towards a second sector;

FIGS. 6 to 8 are views showing a protuberance arranged in a second sector of a setback in order to maximize the flapping movement of a lift assembly;

FIG. 9 is a view showing a link having a body carrying masses of a heavy element;

FIG. 10 is a view showing a link having a body carrying a flyweight;

FIG. 11 is a view of a link having a motor-driven movement member; and

FIG. 12 is a view of a link having a protuberance secured to a body and a setback provided in a rod of the link.

Elements that are present in more than one of the figures are given the same references in each of them.

DETAILED DESCRIPTION OF THE INVENTION

Figure 1:
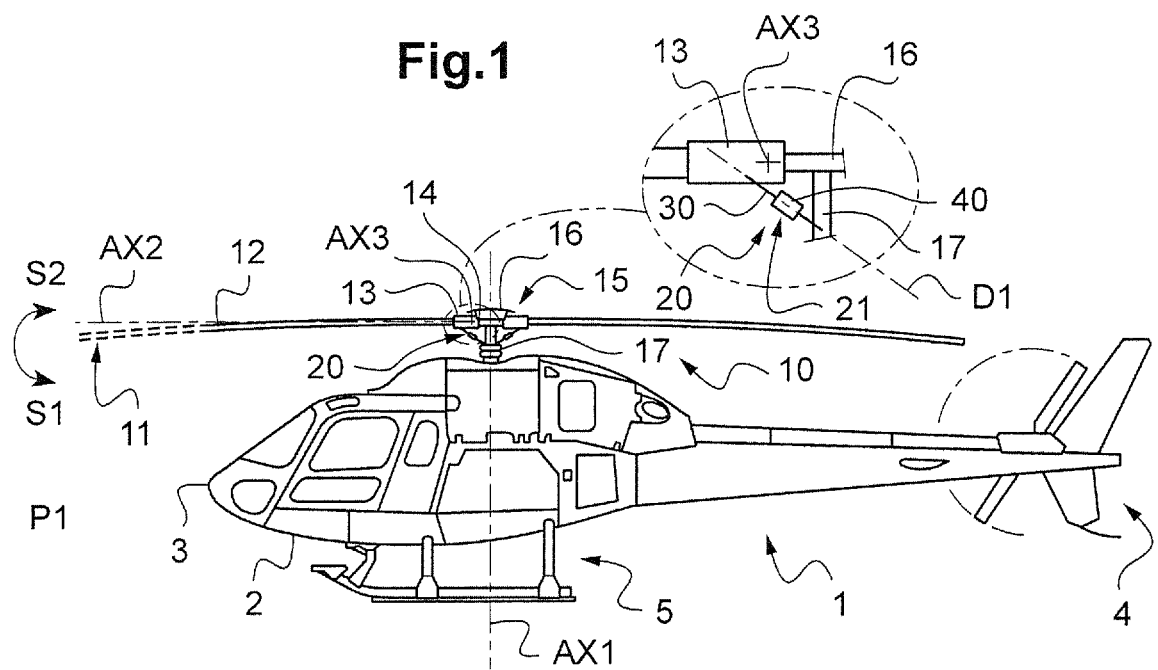
FIG. 1 is a side view of an aircraft of the invention.

FIG. 1 shows an aircraft 1 of the invention.

The aircraft comprises an airframe 2 extending from a nose 3 to a tail end 4. The airframe stands on the ground via landing gear 5.

The airframe also carries at least lift and/or propulsion rotor 10. In FIG. 1, the aircraft 1 is thus a rotorcraft.

The rotor 10 has a plurality of lift assemblies 11, each carried by a driven system 15. The drive system 15 is connected to a power plant in order to drive the lift assemblies 11 in rotation around an axis in elevation AX1.

By way of example, the drive system 15 comprises a mast 17 secured to a hub 16. The hub 16 is thus not hinged to the mast 17 in FIG. 1. Furthermore, the drive system may include a scissors linkage connecting the mast to a set of swashplates for controlling the pitch of the blades.

Each lift assembly 11 includes a lift element 12 and a cuff 13 together forming a blade. The cuff may be incorporated in the lift element or it may be to the lift element.

Under such circumstances, the cuff 13 is hinged to the hub 16 via a retention and mobility member 14, such as a spherical abutment. Each lift assembly is movable in particular in rotation about a pitch axis AX2, and in flapping about a flapping axis AX3.

In order to limit the flapping movement of a lift assembly 12 both downwards S1 and upwards S2, the rotor has a single abutment mechanism 20 per lift assembly 11. The abutment mechanism 20 of any one lift assembly is thus independent of the abutment mechanism 20 of any other lift assembly.

An abutment mechanism 20 of the invention comprises a single link 21 suitable for limiting upward and downward flapping of a lift assembly. This single link extends longitudinally along a longitudinal direction D1 from a proximal end that is hinged to the drive system 15 to a distal end that is hinged to a lift assembly. In particular, the link 21 may be hinged to a cuff of a lift assembly. Furthermore, the link 21 may be hinged to the mast 17, to the hub 16, or indeed to a scissors linkage of the drive system, for example.

In order to limit flapping of a lift assembly 11, the link 21 presents an authorized amount of travel in a longitudinal direction D1 that enables it to lengthen or shorten through a certain amplitude. The travel amplitude of the link 21 may be varied in order to impart freedom to perform flapping movement to a lift assembly that varies as a function of a predetermined parameter. Such a parameter may be the speed of rotation of the rotor about the elevation axis, or indeed it may be the centrifugal force exerted on the link 21, for example.

Under such circumstances, the length between the proximal end of the link and the distal end of the link varies over a travel amplitude, which amplitude varies as a function of the value of the predetermined parameter.

By way of example, the travel of the link may be small for a speed of rotation of the rotor that is small, giving rise to little centrifugal force, while the travel may be large for a speed of rotation of the rotor that is high, giving rise to a large amount of centrifugal force.

In order to modify the travel amplitude authorized for the link 21, the link 21 has a movement member that is not shown in FIG. 1.

Furthermore, the longitudinal direction D1 of a link may for example be situated in a plane P1 referred to as the "pitch plane" that contains the pitch axis AX2 of the lift assembly hinged to the link 21. This pitch axis AX2 then lies above the longitudinal direction D1, i.e. when the aircraft is standing on ground that is substantially level.

FIG. 2 shows an embodiment of a link 21.

Independently of the embodiment, the link 21 comprises a rod 30 that projects in part from a body 40.

The body 40 comprises a hollow casing 41 extending along the longitudinal direction D1.

In the embodiment of FIG. 2, the casing is a cylinder.

In the embodiment of FIG. 9, the casing comprises two plates 42 touching each other. The plates are rounded so as to leave a hollow between them.

Furthermore, and with reference to FIG. 2, the body 40 carries an endpiece 26 referred to as the "first" endpiece. In particular, the body 40 is hinged to the first endpiece 26 so as to be free to swivel about the longitudinal direction D1 relative to the first endpiece 26. Thus, bearing means may be interposed between the casing 41 and the first endpiece 26.

In addition, the first endpiece may include a conventional hinge, in particular a ball-joint hinge 25.

Furthermore, the rod 30 extends from a first end 31 arranged inside the body 40 within the casing 41 to a second end 32. The second end has an endpiece 27 referred to as the "second" endpiece. By way of example, the second endpiece is an integral portion of the rod or it is carried by a bar of the rod. For example, the second endpiece could be screwed into one end of a bar 33 of the rod 30.

The second endpiece may include a conventional hinge, and in particular a ball-joint hinge 25.

The first endpiece 26 and the second endpiece 27 then serve to fasten the link 21 to the rotor. In the figures shown, the first endpiece 26 is hinged to the drive system, and the second endpiece 27 is hinged to a lift assembly. Nevertheless, the first endpiece 26 could be hinged to the lift assembly, and the second endpiece 27 could be hinged to the drive system.

The rod 30 is also movable in translation relative to the body 40 through variable travel. Under such circumstances, a movement member 50 allows the body 40 to move relative to the rod in rotation about the longitudinal direction D1 in order to adjust this travel.

By way of example, the movement member makes it possible to turn the body 40 about the first endpiece 26 and the rod 30.

In the embodiment of FIG. 11, the movement member 50 may be motor-driven, at least in part. The movement member 50 then includes a motor 51. For example, the motor 51 may be an electric motor having a stator 52 secured to the first endpiece 26 and a rotor 53 secured to rotate with the body 40 about the longitudinal direction D1.

The movement member further includes a measurement system 54 for measuring a speed of rotation of the rotor 10 of the aircraft. Any conventional measurement system suitable for measuring a speed of rotation may be used. Such a measurement system is conventional on a rotorcraft.

In the embodiment of FIG. 2, the movement member 50 may be mechanical.

The movement member 50 comprises a heavy element 55 secured to the casing 41 and offset relative to the longitudinal direction D1. The heavy element 55 offsets the center of gravity CG of the body 40 away from the longitudinal direction D1.

The manufacturer positions the heavy element so that the centrifugal force FC exerted on the body 40 during rotation of the drive system 15 generates movement in rotation of the body 40 relative to the rod 30 so as to modify the authorized travel amplitude of the link 21.

In FIG. 2, the heavy element 55 comprises an extra thickness 56 forming part of the casing 41.

In the embodiment of FIG. 9, masses 56 are fastened to the plates 42 of the body.

In the embodiment of FIG. 10, the heavy element 55 comprises at least one flyweight 57 that is fastened to the body 40. The flyweight is offset radially relative to the body 40, being carried by a tube 57' extending between the body and the flyweight.

Furthermore, and with reference to FIG. 2, the movement member 50 may include a resilient return member 58 that tends to oppose the centrifugal force FC exerted on the body.

Such a return member may comprise a block of elastic material, or indeed a spring, for example.

The resilient return member may be fastened to the body 40, i.e. to the casing 41, to the first endpiece 26, to the heavy element, or indeed to the drive system.

In FIG. 2, the return member is fastened to the body 40 and to the first embodiment 26. FIGS. 9 and 10 show other configurations.

With reference to FIG. 2, the link 21 may comprise two abutment members that co-operate with each other to limit the lengthening and shortening of the link to an amplitude that is variable.

Thus, two abutment members are carried respectively by the rod 30 and the body 40 of the link so as to limit movement in translation in the longitudinal direction D1 of the rod relative to the body 40.

A first abutment member 60 comprises a protuberance 61 extending radially, i.e. in a direction that is perpendicular to the longitudinal direction D1.

Furthermore, a second abutment member comprises a setback 62 formed in a wall, the protuberance moving in the setback.

In FIG. 2, the protuberance is part of the rod 30, being carried by the bar 33. Conversely, the setback 62 is formed in a peripheral wall of the casing of the body 40.

In FIG. 12, the protuberance forms part of a peripheral wall of the casing of the body 40. Conversely, the setback 62 is formed in the wall of the bar 33.

Independently of the variant and with reference to FIG. 2, the setback 62 is defined longitudinally, i.e. along the longitudinal direction D1, by a high abutment surface 63 and by a low abutment surface 64. Under such circumstances, the protuberance 61 is always located in the setback between the high abutment surface 63 and the low abutment surface 64.

In addition, the setback presents longitudinally a height that varies circumferentially.

Thus, the height lying longitudinally between the high abutment surface 63 and said low abutment surface 64 varies circumferentially between a minimum height H1 obtained in a first sector 65 of the setback 62 and a maximum height H2 obtained in a second sector 66 of the setback 62.

This variation in height makes it possible to modify the travel amplitude of the link 21 as a function of the sector in which the protuberance is to be found. The travel amplitude 70 is at a minimum when the protuberance 61 is positioned in the first sector 65 by the movement member 50. In contrast, this amplitude is at a maximum when the protuberance 61 is positioned in the second sector 66 by the movement member 5. The amplitude 70 is represented by a double-headed arrow in FIG. 2.

In addition, in order to vary said amplitude 70, the high abutment surface 63 and the low abutment surface 64 depart from each other in a circumferential direction S3, going from the first sector 65 towards the second sector 66.

Optionally, the high abutment surface 63 and the low abutment surface 64 are symmetrical to each other about a plane of symmetry P2 perpendicular to the longitudinal direction D1.

At all times, the high abutment surface 63 limits the amplitude 70 with which the link 21 can lengthen by interference between the protuberance and the high abutment surface.

In contrast, shortening of the link may be limited either by interference between the protuberance and the low abutment surface, or else by interference between the rod 30 and an end wall 43 of the body 40. Such an end wall may be in the form of an end zone of the first endpiece closing the hollow space of the body 40.

Figure 4:
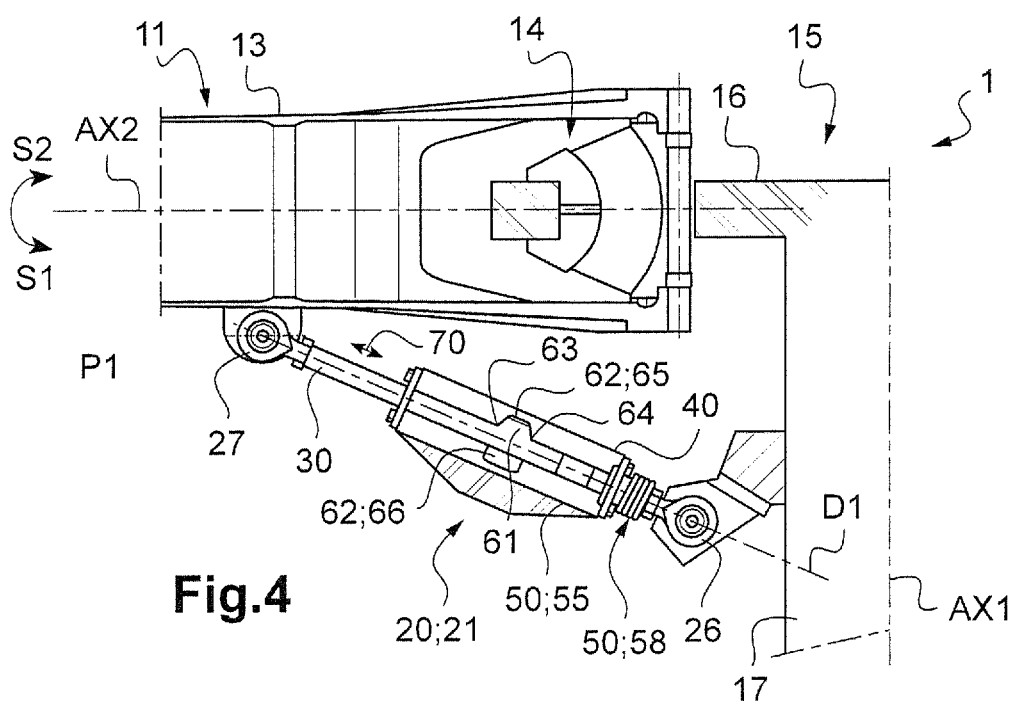

With reference to FIGS. 3 and 4, when the rotor is stationary and so long as the rotor is rotating at less than a threshold speed of rotation, the protuberance 61 of the link 21 is to be found in the first sector 65 of the setback 62.

Under such circumstances, the blade can perform movement over an amplitude that is very small and that corresponds to the clearance between the protuberance and the high and low abutment surfaces 63 and 64.

Downward flapping movement S1 of the lift assembly is then rapidly stopped when the protuberance strikes the low abutment surface. Likewise, upward flapping movement S2 of the lift assembly is rapidly stopped when the protuberance strikes the high abutment surface 63.

The flapping of the lift assembly is then limited by the amplitude 70 of the link 21, this amplitude being at a minimum while the protuberance is arranged in the first sector 65.

With reference to FIG. 5, once the rotor reaches a threshold speed of rotation, the movement means causes the body 40 and the rod 30 to move relative to each other in rotation ROT about the longitudinal direction D1. This movement in rotation may be initiated under the effect of the centrifugal force exerted on a heavy element of the link, or by a motor, depending on the embodiment. The force exerted by the centrifugal force or by the motor on the body or on the rod is then greater than the force exerted by a return member 58, if any.

The protuberance 61 thus moves circumferentially in the setback going from the first sector of the setback towards its second sector.

With reference to FIG. 6, the protuberance is located in the second sector at the end of the transition stage. The travel amplitude authorized for the link is then at a maximum. Likewise, the lift assembly can then perform downward and upward flapping movement S1 and S2 over a maximum amplitude.

With reference to FIG. 7, upward flapping movement S2 comes to an end when the protuberance 61 comes into contact against the high abutment surface 63.

FIG. 7 shows the second sector in section view. Whatever the position of the protuberance within the second sector, an inside space 100 between the rod 30 and an end wall 43 of the body 40 extends over a primary height H3, which is less than a secondary height H4 between the protuberance 61 and the low abutment surface 64.

Under such circumstances, and with reference to FIG. 8, when the protuberance 61 is located in the second sector 66, Downward flapping movement S1 of a lift assembly comes to an end when the rod comes into contact with the end wall 43.

This characteristic makes it possible to obtain a large bearing surface area between the rod and the body, and thus to hold the lift assembly firmly in its low position.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An abutment mechanism for limiting flapping in two opposite directions of a lift assembly of a rotorcraft relative to a drive system, the drive system being suitable for driving the lift assembly in rotation about an axis in elevation, wherein the abutment mechanism comprises a single rigid link having variable travel in a longitudinal direction in which the link extends, the link comprising a rod and a body, the rod being movable in translation relative to the body along the longitudinal direction through the travel, the abutment mechanism including a movement member for adjusting an amplitude of the travel as a function of at least one predetermined parameter, the link having a first endpiece and a second endpiece suitable for being hinged respectively to the lift assembly and to the drive system, the first endpiece being attached to the body, and the second endpiece being secured to the rod, wherein the rod extends from a first end arranged in the body to a second end provided with the second endpiece, the rod being movable in rotation and in translation relative to the body, the rod and the body each having a respective abutment member, one of the abutment members comprising a radial protuberance and the other abutment member comprising a setback in a wall, the radial protuberance being movable in the setback, the setback being defined longitudinally by a high abutment surface and by a low abutment surface between which the protuberance is permanently arranged, the high abutment surface and the low abutment surface being separated by a longitudinal height that varies circumferentially between a minimum height obtained in a first sector of the setback and a maximum height obtained in a second sector of the setback, the amplitude of the travel being at a minimum when the protuberance is positioned in the first sector by the movement member and being at a maximum when the protuberance is positioned in the second sector by the movement member.

2. The abutment mechanism according to claim 1, wherein at least one of the two endpieces includes a ball-joint hinge.

3. The abutment mechanism according to claim 1, wherein the body is hinged to the first endpiece to be movable in rotation relative to the first endpiece, and to the rod about the longitudinal direction, the movement member moving the body in rotation relative to the first endpiece and to the rod in order to vary the travel authorized for the rod relative to the body.

4. The abutment mechanism according to claim 1, wherein the high abutment surface and the low abutment surface depart from each other in a circumferential direction starting from the first sector and going towards the second sector.

5. The abutment mechanism according to claim 1, wherein the high abutment surface and the low abutment surface are arranged symmetrically about a plane of symmetry that is perpendicular to the longitudinal direction.

6. The abutment mechanism according to claim 1, wherein the high abutment surface acts at all times to limit lengthening amplitude of the link.

7. The abutment mechanism according to claim 1, wherein the link has an amplitude of shortening that is limited by the low abutment surface while the protuberance is arranged in the first sector.

8. The abutment mechanism according to claim 1, wherein an internal space between the rod and an end wall of the body occupies a primary height that is less than a secondary height between the protuberance and the low abutment surface while the protuberance is arranged in the second sector, with shortening of the link then being interrupted when the rod comes into contact with the end wall.

9. The abutment mechanism according to claim 1, wherein the movement member includes a motor, the predetermined parameter being a speed of rotation.

10. The abutment mechanism according to claim 1, wherein the movement member includes a heavy element for offsetting the center of gravity of the body from the longitudinal direction so that the centrifugal force exerted on the body during rotation of the drive system generates movement in rotation of the body relative to the rod, the predetermined parameter being the centrifugal force, the movement member including a resilient return member tending to move the body relative to the rod in order to place the protuberance in the first sector.

11. The abutment mechanism according to claim 10, wherein the heavy element includes at least one flyweight that is fastened to the body and radially offset relative to the body.

12. The abutment mechanism according to claim 10, wherein the resilient return member is fastened to the body.

13. The abutment mechanism according to claim 10, wherein the resilient return member is fastened to the first endpiece.

14. The abutment mechanism according to claim 10, wherein the resilient return member is fastened to the heavy element.

15. A rotor having a plurality of lift assemblies and a drive system for driving the lift assemblies in rotation, wherein the rotor includes, for at least one lift assembly, a single abutment mechanism according to claim 1 so as to limit upward and downward flapping of the at least one lift assembly, the link of the abutment mechanism being hinged to the at least one lift assembly and to the drive system.

16. The rotor according to claim 15, wherein the at least one lift assembly is movable in rotation about a pitch axis to modify an aerodynamic angle of incidence of the at least one lift assembly, the longitudinal direction is situated in a pitch plane containing the pitch axis.

17. An aircraft having a rotor, wherein the rotor is the rotor according to claim 15.

18. An abutment mechanism for limiting flapping in two opposite directions of a lift assembly of a rotorcraft relative to a drive system, the drive system being suitable for driving the lift assembly in rotation about an axis in elevation, wherein the abutment mechanism comprises a single rigid link having variable travel in a longitudinal direction in which the link extends, the link comprising a rod and a body, the rod being movable in translation relative to the body along the longitudinal direction through the travel, the abutment mechanism including a movement member for adjusting an amplitude of the travel as a function of at least one predetermined parameter, the link having a first endpiece and a second endpiece suitable for being hinged respectively to the lift assembly and to the drive system, the first endpiece being attached to the body, and the second endpiece being secured to the rod, wherein the body is hinged to the first endpiece to be movable in rotation relative to the first endpiece, and to the rod about the longitudinal direction, the movement member moving the body in rotation relative to the first endpiece and to the rod in order to vary the travel authorized for the rod relative to the body.

19. The abutment mechanism according to claim 18, wherein at least one of the two endpieces includes a ball-joint hinge.

20. An abutment mechanism for limiting flapping in two opposite directions of a lift assembly of a rotorcraft relative to a drive system, the drive system being suitable for driving the lift assembly in rotation about an axis in elevation, wherein the abutment mechanism comprises a single rigid link having variable travel in a longitudinal direction in which the link extends, the link comprising a rod and a body, the rod being movable in translation relative to the body along the longitudinal direction through the travel, the abutment mechanism including a movement member for adjusting an amplitude of the travel as a function of at least one predetermined parameter, the link having a first endpiece and a second endpiece suitable for being hinged respectively to the lift assembly and to the drive system, the first endpiece being attached to the body, and the second endpiece being secured to the rod, wherein the movement member includes a heavy element for offsetting the center of gravity of the body from the longitudinal direction so that the centrifugal force exerted on the body during rotation of the drive system generates movement in rotation of the body relative to the rod, the predetermined parameter being the centrifugal force, the movement member including a resilient return member tending to move the body relative to the rod in order to place a protuberance in a first sector.

* * * * *